US009616776B1

(12) United States Patent
Kondrad et al.

(10) Patent No.: US 9,616,776 B1
(45) Date of Patent: Apr. 11, 2017

(54) INTEGRATED POWER THIGH EXTENDER

(71) Applicant: Ford Global Technologies, LLC, Dearborn, MI (US)

(72) Inventors: Marcos Silva Kondrad, Macomb Township, MI (US); Christian J. Hosbach, Taylor, MI (US); Johnathan Andrew Line, Northville, MI (US); Rodney Charles Brinker, Eastpointe, MI (US); Nicholas Alphonse Billardello, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/941,936

(22) Filed: Nov. 16, 2015

(51) Int. Cl.
*B60N 2/02* (2006.01)
*B60N 2/62* (2006.01)

(52) U.S. Cl.
CPC ......... *B60N 2/0284* (2013.01); *B60N 2/0232* (2013.01)

(58) Field of Classification Search
CPC ............................ B60N 2/0284; B60N 2/0232
USPC ................................................... 297/284.11
See application file for complete search history.

(56) References Cited

U.S. PATENT DOCUMENTS

| 2,958,369 | A | 11/1960 | Pitts et al. |
|---|---|---|---|
| 3,403,938 | A | 10/1968 | Cramer et al. |
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |
| 4,491,365 | A | 1/1985 | Murakami |
| 4,541,669 | A | 9/1985 | Goldner |
| 4,629,248 | A | 12/1986 | Mawbey |
| 4,664,444 | A | 5/1987 | Murphy |
| 4,720,141 | A | 1/1988 | Sakamoto et al. |

(Continued)

FOREIGN PATENT DOCUMENTS

| EP | 0754590 | 1/1997 |
|---|---|---|
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Rodney B White
(74) *Attorney, Agent, or Firm* — Vichit Chea; Price Heneveld LLP

(57) ABSTRACT

A vehicle seat assembly includes a seat portion with a carrier assembly having an adjustable thigh support assembly disposed therein. First and second slide members are disposed on a support platform coupled to the carrier assembly in a carriage receiving area. A carriage assembly is configured for lateral reception in the carriage receiving area. The carriage assembly includes first and second guide channels. The first and second slide members are slideably received in the first and second guide channels of the carriage assembly to slideably couple the carriage assembly to the carrier assembly for lateral movement of the carriage assembly between extended and stowed positions relative to a rear portion of the seat portion.

17 Claims, 18 Drawing Sheets

(56) References Cited

U.S. PATENT DOCUMENTS

| | | | |
|---|---|---|---|
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,106,163 A | 8/2000 | Inana et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,419,317 B1 | 7/2002 | Westrich et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,104,609 B2 * | 9/2006 | Kim | A47C 1/03 297/284.11 |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,578,554 B2 | 8/2009 | Lee | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,909,401 B2 | 3/2011 | Hofmann et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 7,997,648 B2 * | 8/2011 | Becker | B60N 2/0284 297/284.11 |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,408,646 B2 | 4/2013 | Harper et al. | |
| 8,888,181 B2 * | 11/2014 | Perraut | B60N 2/23 297/284.11 |
| 9,016,783 B2 * | 4/2015 | Line | B60N 2/0224 297/284.11 |
| 9,016,784 B2 * | 4/2015 | Line | B60N 2/0284 297/284.11 |
| 9,016,785 B2 * | 4/2015 | Freisleben | B60N 2/0232 297/284.11 |
| 9,039,085 B2 * | 5/2015 | Aselage | B60N 2/0284 297/284.11 |
| 2001/0004164 A1 * | 6/2001 | Mattsson | B60N 2/0284 297/284.11 X |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0102985 A1 * | 5/2007 | Taniguchi | B60N 2/0284 297/284.11 X |
| 2007/0120401 A1 | 5/2007 | Minuth et al. | |
| 2008/0157577 A1 * | 7/2008 | Lindsay | B60N 2/0224 297/284.11 |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0200848 A1 * | 8/2009 | Kubler | B60N 2/0232 297/284.11 |
| 2009/0322124 A1 | 12/2009 | Barkow et al. | |

(56) References Cited

U.S. PATENT DOCUMENTS

| | | |
|---|---|---|
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0320730 A1* | 12/2013 | Aselage ............... B60N 2/0284 297/337 |
| 2015/0258914 A1* | 9/2015 | Lee ..................... B60N 2/62 297/284.11 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

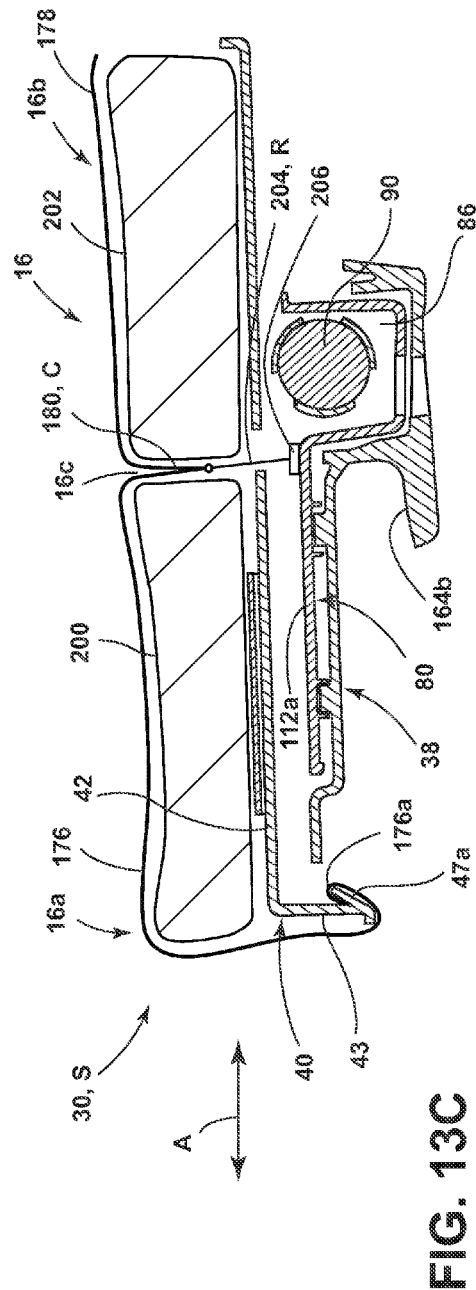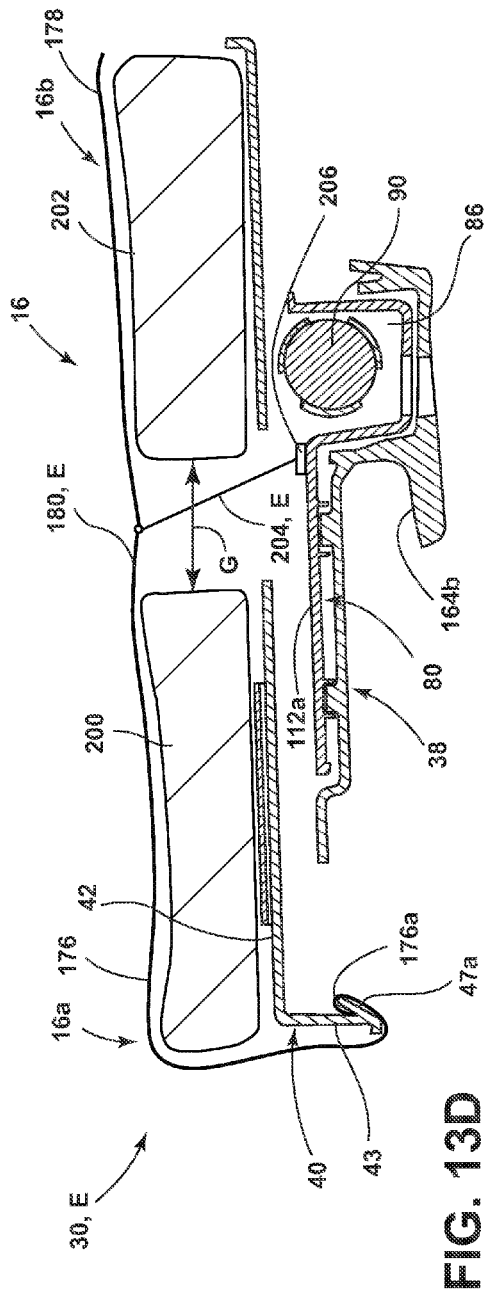

INTEGRATED POWER THIGH EXTENDER

FIELD OF THE INVENTION

The present invention generally relates to a vehicle seating assembly, and more particularly, a vehicle seating assembly having an adjustable thigh support feature.

BACKGROUND OF THE INVENTION

Modern vehicle seats are becoming more and more comfortable as a further understanding of human ergonomics, posture, and comfortability is achieved. Vehicle seating assemblies that include comfort components in the vehicle seatback and the vehicle seat can provide vehicle occupants with improved comfort and increased endurance for extensive vehicle travel. Additionally, various sizes and shapes of drivers and passengers can prove challenging when providing vehicle seating assemblies designed to accommodate such passengers. Accordingly, vehicle seating assemblies that include components configured to accommodate the different sizes and shapes of drivers and passengers, as well as the desired posture and sitting positions of those drivers and passengers, has become increasingly important.

SUMMARY OF THE INVENTION

One aspect of the present invention includes a vehicle seat having a seat portion with a carrier assembly disposed therein. The carrier assembly includes a first side member that is spaced-apart from a second side member to define a carriage receiving area therebetween. First and second slide members are disposed in the carriage receiving area. A carriage assembly is configured for lateral reception in the carriage receiving area. The carriage assembly includes first and second guide channels disposed on an underside of a body portion. The first and second slide members are slideably received in the first and second guide channels of the carriage assembly to slideably couple the carriage assembly to the carrier assembly for lateral movement of the carriage assembly between extended and stowed positions relative to the seat portion.

Another aspect of the present invention includes a vehicle seat having a seat portion with a carrier assembly disposed therein. The carrier assembly includes a carriage receiving area. A carriage assembly is slideably coupled to the carrier assembly for lateral movement between extended and stowed positions at the carriage receiving area. A slide assembly having upper and lower slide members disposed on the carriage assembly and the carrier assembly, respectively, is configured for guiding lateral movement of the carriage assembly between the stowed and extended positions relative to the carrier assembly.

Yet another aspect of the present invention includes a vehicle seat having a seat portion supported by a seat frame assembly. A carrier assembly is disposed in the seat portion and is operably coupled to the seat frame assembly. The carrier assembly includes a first side member spaced-apart from a second side member to define a carriage receiving area therebetween. A support platform disposed in the carriage receiving area. The support platform includes at least one slide member disposed on an upper surface thereof. A carriage assembly is laterally received in the carriage receiving area and includes a substantially planar body portion having at least one guide channel disposed on an underside thereof for slideably receiving the at least one slide member. A motor is operably coupled to the carrier assembly and includes an outwardly extending driveshaft configured for rotation as powered by the motor. A mounting bracket is operably coupled to the driveshaft and further coupled to the body portion of the carriage assembly. In assembly, the motor is configured to drive the carriage assembly between stowed and extended positions.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 13C is a cross-sectional view of the vehicle seat of FIG. 13A; and

FIG. 13D is a cross-sectional view of the vehicle seat of FIG. 13B.

DETAILED DESCRIPTION OF THE PREFERRED EMBODIMENTS

Figure 1A:
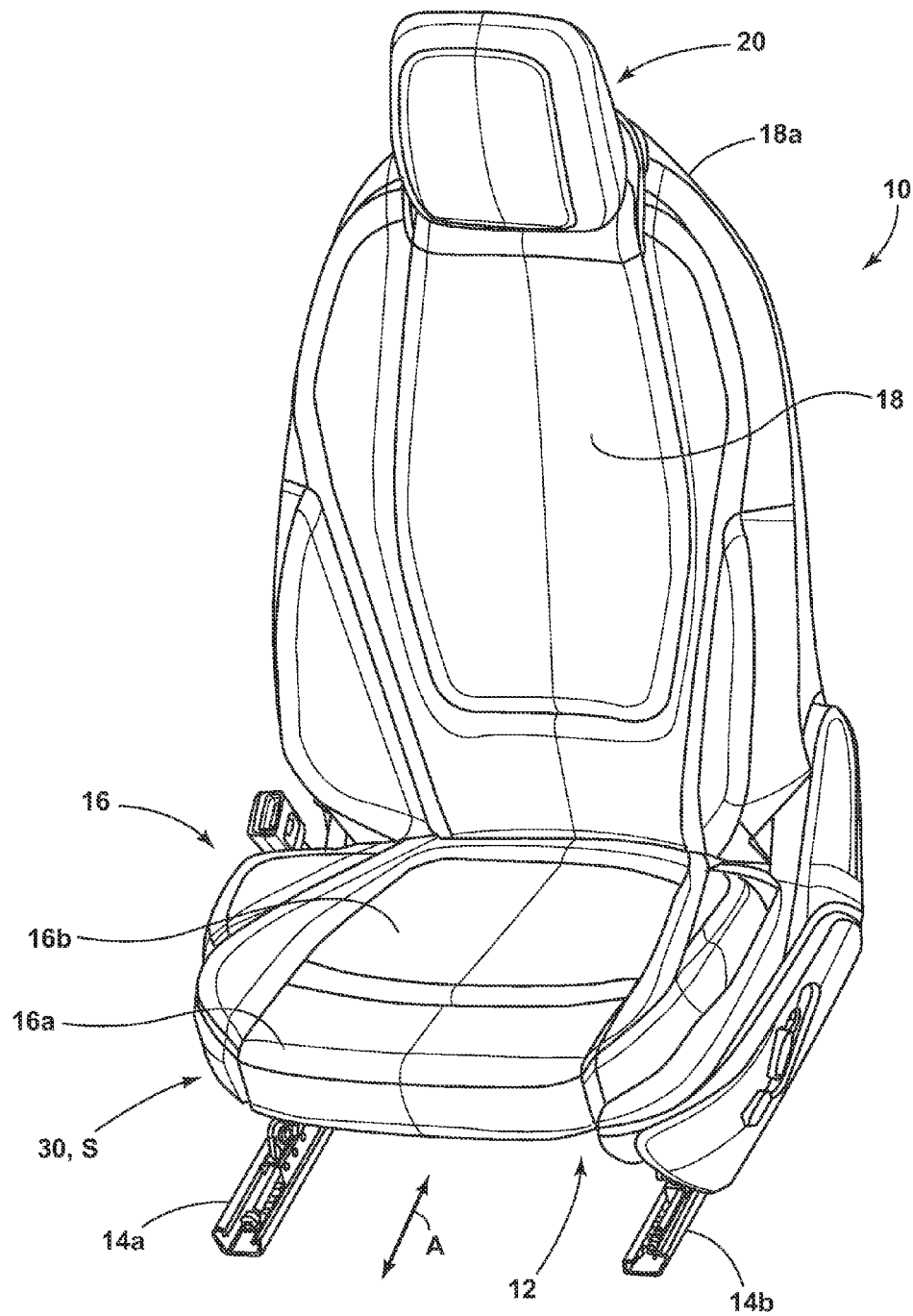
FIG. 1A is a front perspective view of a vehicle seat having an adjustable thigh support assembly in a stowed position.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIG. 1A, a vehicle seat 10 is shown contemplated for use in a vehicle interior. The illustrated vehicle seat 10 is configured for use in a vehicle of any type, including, without limitations, cars, vans, trucks, buses, etc. The vehicle seat 10 includes a seat frame 12 suspended on rails 14a, 14b that allow movement of the vehicle seat 10 in fore and aft directions within the vehicle interior. The vehicle seat 10 includes a seat portion 16 which is supported by the seat frame 12 (FIG. 2) and which is further coupled to a seatback 18. The seat portion 16 includes a front portion 16a and a rear portion 16b which are configured to support a vehicle occupant. Specifically, the rear portion 16b is positioned to support a seat of a vehicle occupant and the front portion 16a is positioned to support the thigh area of a vehicle occupant. The seatback 18 is contemplated to be pivotally coupled to the seat portion 16 for reclining and folding movement relative to the seat portion 16. The seatback 18 further includes an upper portion 18a having a headrest assembly 20 supported therefrom. The vehicle seat 10 of FIG. 1A is shown as a driver's side vehicle seat, however, it is contemplated that the vehicle seat 10 of the present invention may be disposed in any part of a vehicle, including passenger seats, rear seats, folding seats and third row passenger seating options. As such, the vehicle seat assembly 10 shown in FIG. 1A is not intended to limit the spirit of the invention as shown in the form of a front driver's side vehicle seat 10. The vehicle seat 10 shown in FIG. 1A has a seat cover removed therefrom to better show a plurality of cushion supports disposed on the seat portion 16, the seatback 18 and the headrest assembly 20 of the vehicle seat 10. However, it is contemplated that the seat portion 16, including the front and rear portions 16a, 16b, the seatback 18, and the headrest assembly 20 will be covered with a seat cover material in assembly.

Figure 1B:
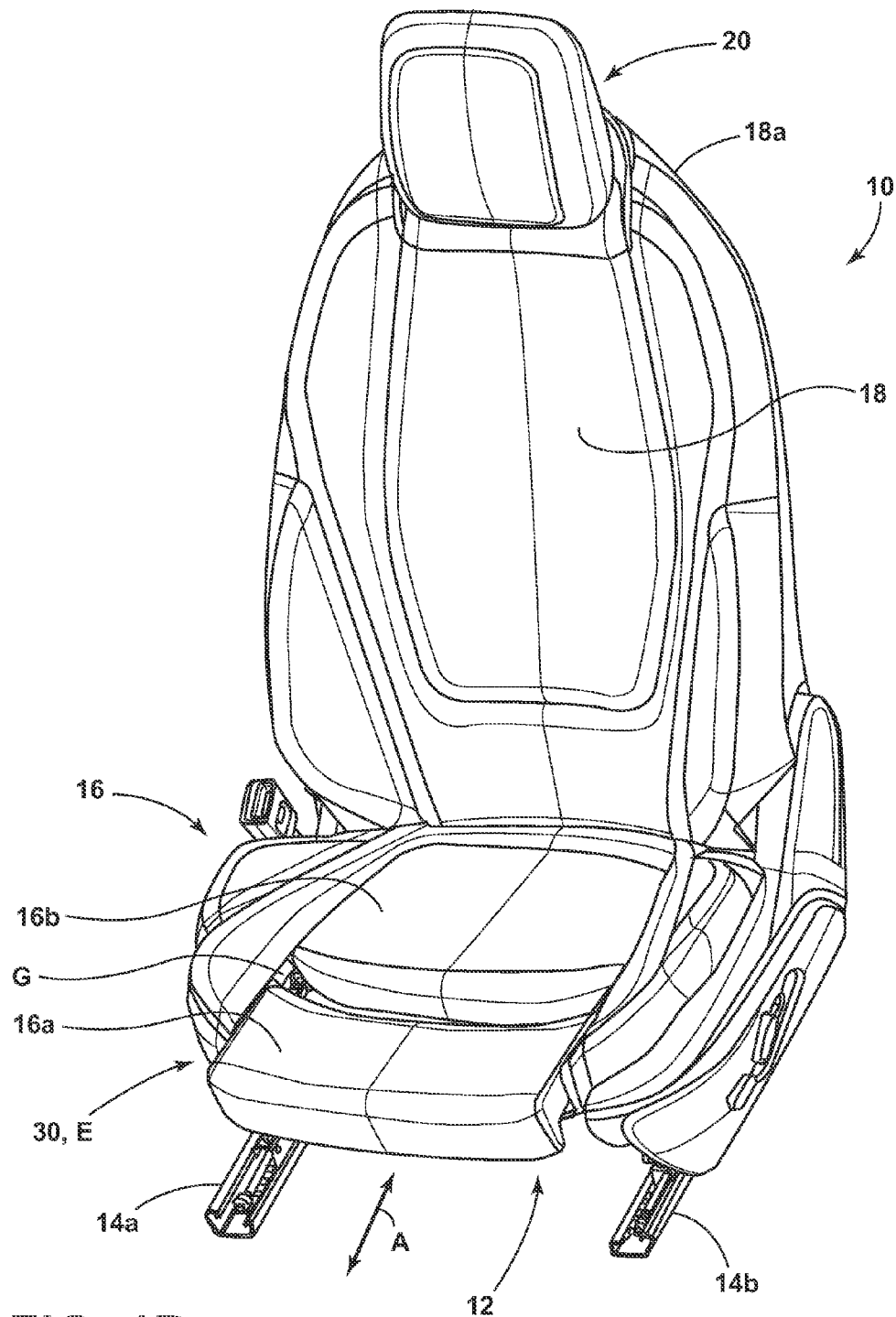
FIG. 1B is a front perspective view of the vehicle seat of FIG. 1A with the adjustable thigh support assembly in an extended position.

With reference to FIGS. 1A and 1B, the vehicle seat 10 includes an adjustable thigh support assembly 30 which defines the front portion 16a of the seat portion 16 and is configured to adjust in a substantially horizontal or lateral manner between extended and stowed positions along the path indicated by arrow A. In FIG. 1A, the adjustable thigh support assembly 30 is shown in the stowed position S. With reference to FIG. 1B, the adjustable thigh support assembly 30 is shown in the extended position E. As such, the adjustable thigh support assembly 30 is configured to move the front portion 16a of the seat portion 16 away from the rear portion 16b of the seat portion 16 to form a gap G therebetween. The gap G is covered by a seat cover that may be a cloth trim cover as better shown in FIG. 13B. It is contemplated that the adjustable thigh support assembly 30 can move the front portion 16a of the seat portion 16 up to 50 mm from the stowed position S (FIG. 1A) to the extended position E (FIG. 1B), and further support the front portion 16a of the seat portion 16 at any position therebetween. Other ranges of movement are also contemplated for use with the present concept.

Figure 2:
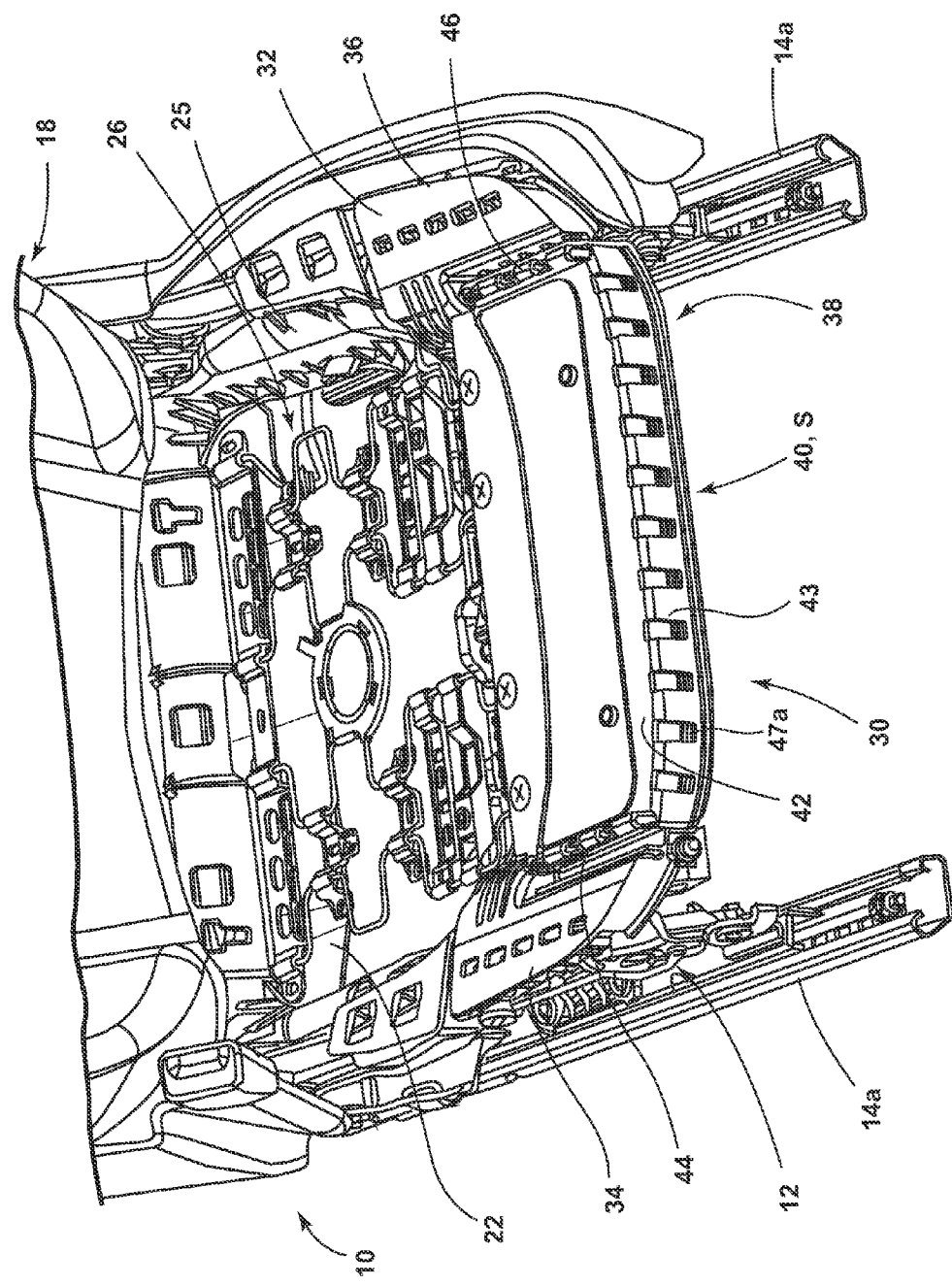
FIG. 2 is a top perspective view of the vehicle seat of FIG. 1 with various components removed to reveal structural components of a seat portion.
Figure 12:
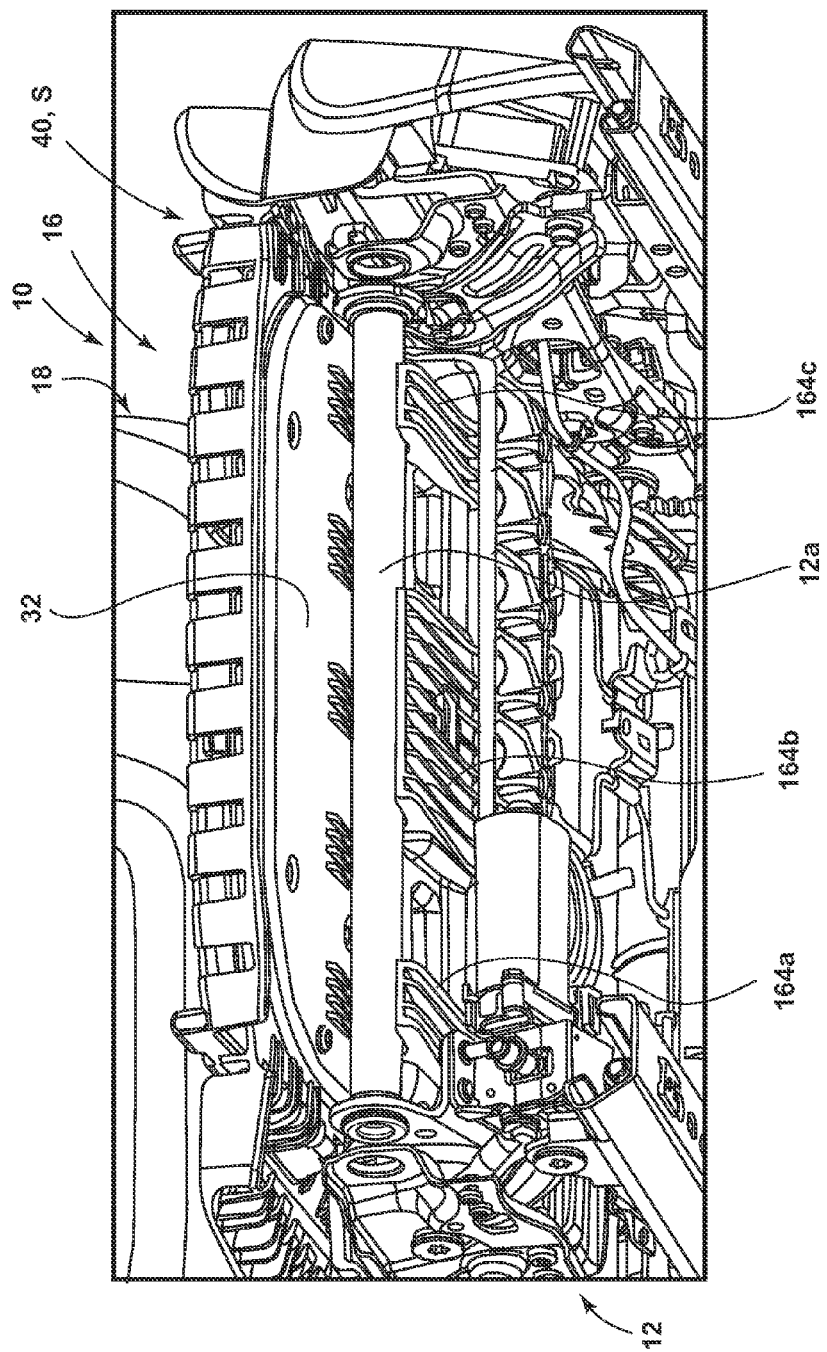
FIG. 12 is a bottom perspective view of the carriage assembly coupled to the seat frame.

Referring now to FIG. 2, the seat portion 16 of the vehicle seat 10 is shown having the seat cover, cushions and other trim components removed to reveal the seat frame 12 and other structural features. A lower trim cover 22 is shown disposed near the pivoting connection between the seat portion 16 and the seatback 18. A rear bracket 24 is shown having engagement features for coupling to a rear carrier 25 of the seat portion 16. A suspension system 26 interconnects the rear bracket 24 with a front carrier assembly 32. The thigh support assembly 30 is contemplated to be coupled to the seat frame 12 of the seat portion 16, as best shown in FIG. 12. As noted above, the thigh support assembly 30 is disposed on a carrier assembly 32 which includes first and second side members 34, 36 which are spaced apart to define a carriage receiving area 38 therebetween. As further shown in FIG. 2, an extendable carriage assembly 40 is slidably received in the carriage receiving area 38 for movement between fore and aft directions as indicated by arrow A. The carriage assembly 40 includes a body portion 42 having a front portion 43. First and second trim channels 44, 46 of the carriage assembly 40 are disposed on opposite sides of the body portion 42 and are configured to couple to a seat cover for covering portions of the adjustable thigh support assembly 30.

Figure 3:
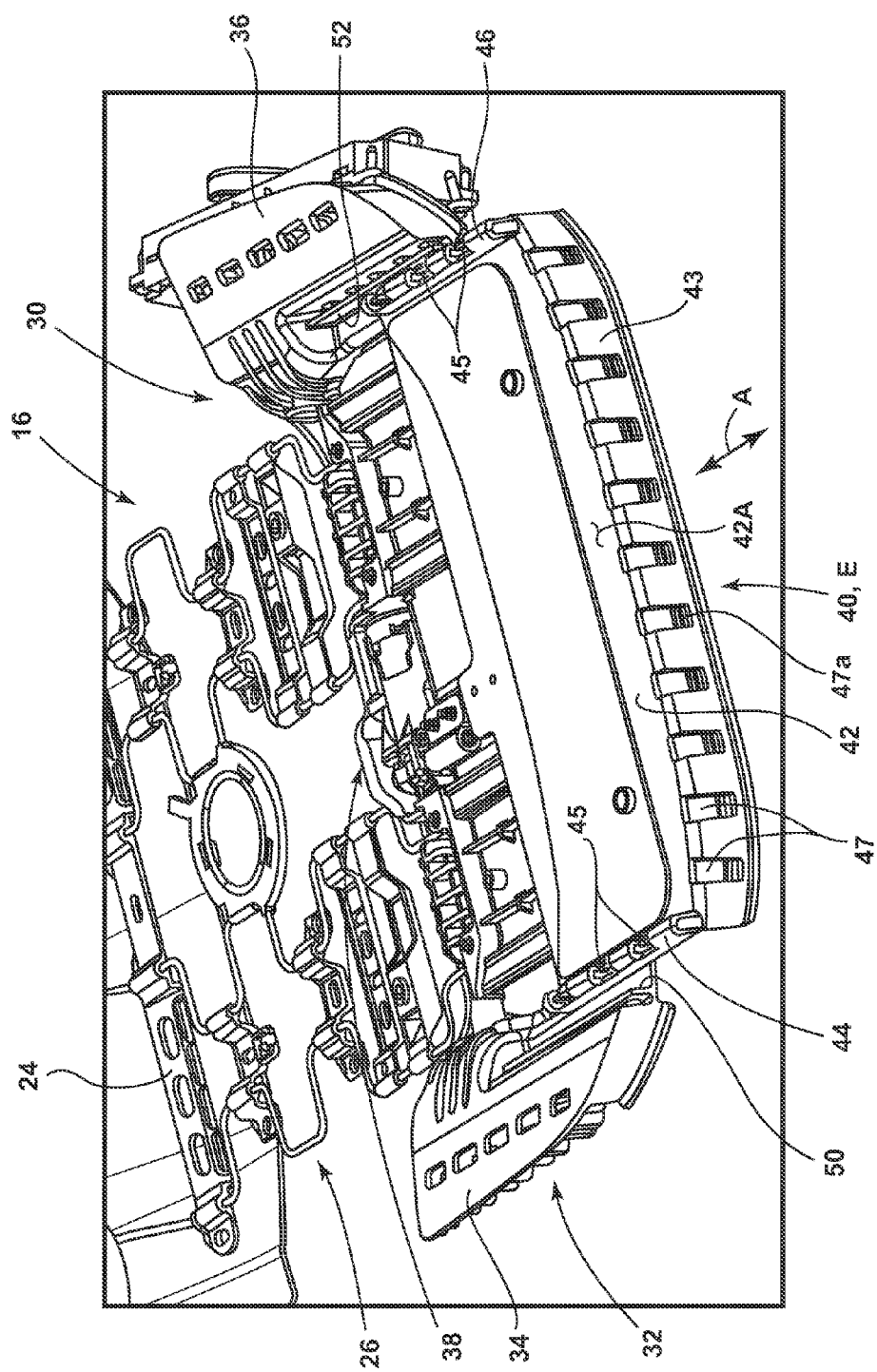
FIG. 3 is a top perspective view of the seat portion of the vehicle seat of FIG. 2 with a thigh support assembly in an extended position.

Referring now to FIG. 3, the carriage assembly 40 is shown in an extended position E, such that the carriage receiving area 38 is better revealed. As used throughout this disclosure, the carriage assembly 40 and the adjustable thigh support assembly 30 may both be referred to as being in either a stowed portion S or an extended position E. When the stowed position S is referenced, the adjustable thigh support assembly 30 is contemplated to have the carriage assembly 40 retracted relative to the carrier assembly 32 (see FIG. 2). When the extended position E is referenced, the adjustable thigh support assembly 30 is contemplated to have the carriage assembly 40 extended outwardly from the carrier assembly 32 (see FIG. 3). The first and second sides 34, 36 of the carrier assembly 32 each include upstanding mounting flanges 50, 52 which are configured to couple to a seat cover for covering a portion of the seat portion 16. The first and second sides 44, 46 of the carriage assembly 40 are contemplated to have a generally downwardly opening U-shaped channel and include trim attachment features 45 which are similar to trim attachment features 47 disposed on the front portion 43 of the carriage assembly 40. The trim attachment features 45, 47 are shown as cutout or relief portions disposed along the first and second sides 44, 46 and the front portion 43 of the carriage assembly 40, which are configured to receive clips or other fasteners, such as hooks 47a (FIG. 9B) for connecting a trim component or seat cover 176 (FIG. 13A) to the thigh support assembly 30.

Figure 4:
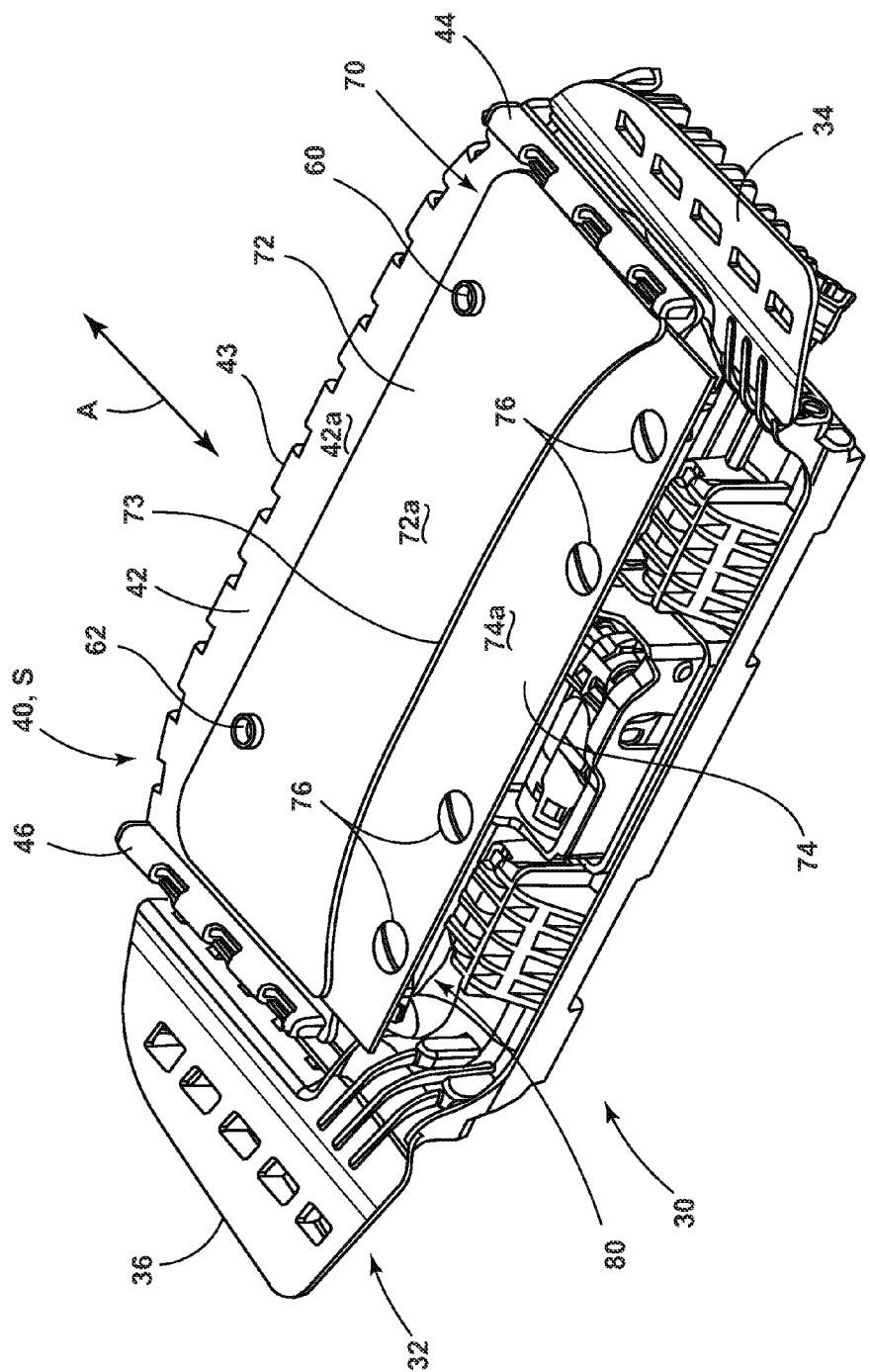
FIG. 4 is a top perspective view of the thigh support assembly of FIG. 3 in a stowed position.

Referring now to FIG. 4, the adjustable thigh support assembly 30 is shown with the carriage assembly 40 in the stowed position S relative to the carrier assembly 32. First and second mounting bosses 60, 62 are shown extending upwardly from the upper surface 42a of the body portion 42 of the carriage assembly 40. The mounting bosses 60, 62 are used to couple a first portion 72 of a gap hider assembly 70 to the upper surface 42a of the carriage assembly 40. The gap hider assembly 70 includes a second portion 74 which is coupled to a support platform 80 via fasteners 76. The first and second portions 72, 74 of the gap hider assembly 70 are substantially planar portions with the second portion 74 disposed under the first portion 72. The second portion 74 is stationary as coupled to the support platform 80 which is further coupled to the carrier assembly 32, as further described below. The first portion 72 is configured to move with the carriage assembly 40 between the stowed and extended positions S, E along the path as indicated by arrow A. Thus, as the carriage assembly 40 moves outwardly towards the extended position E, a rear edge 73 of the first portion 72 slides forward along a substantially planar body portion 74a of the second portion 74 of the gap hider assembly 70, while the second portion 74 remains stationary. Thus, the gap hider assembly 70 defines a bottom wall of gap G disposed between the carriage assembly 40 and the carrier assembly 32 and provides a constant surface via the sliding relationship between the first and second portions 72, 74. The first and second portions 72, 74 are generally planar members having planar body portions 72a, 74a, respectively, as shown in FIG. 4.

Figure 5:
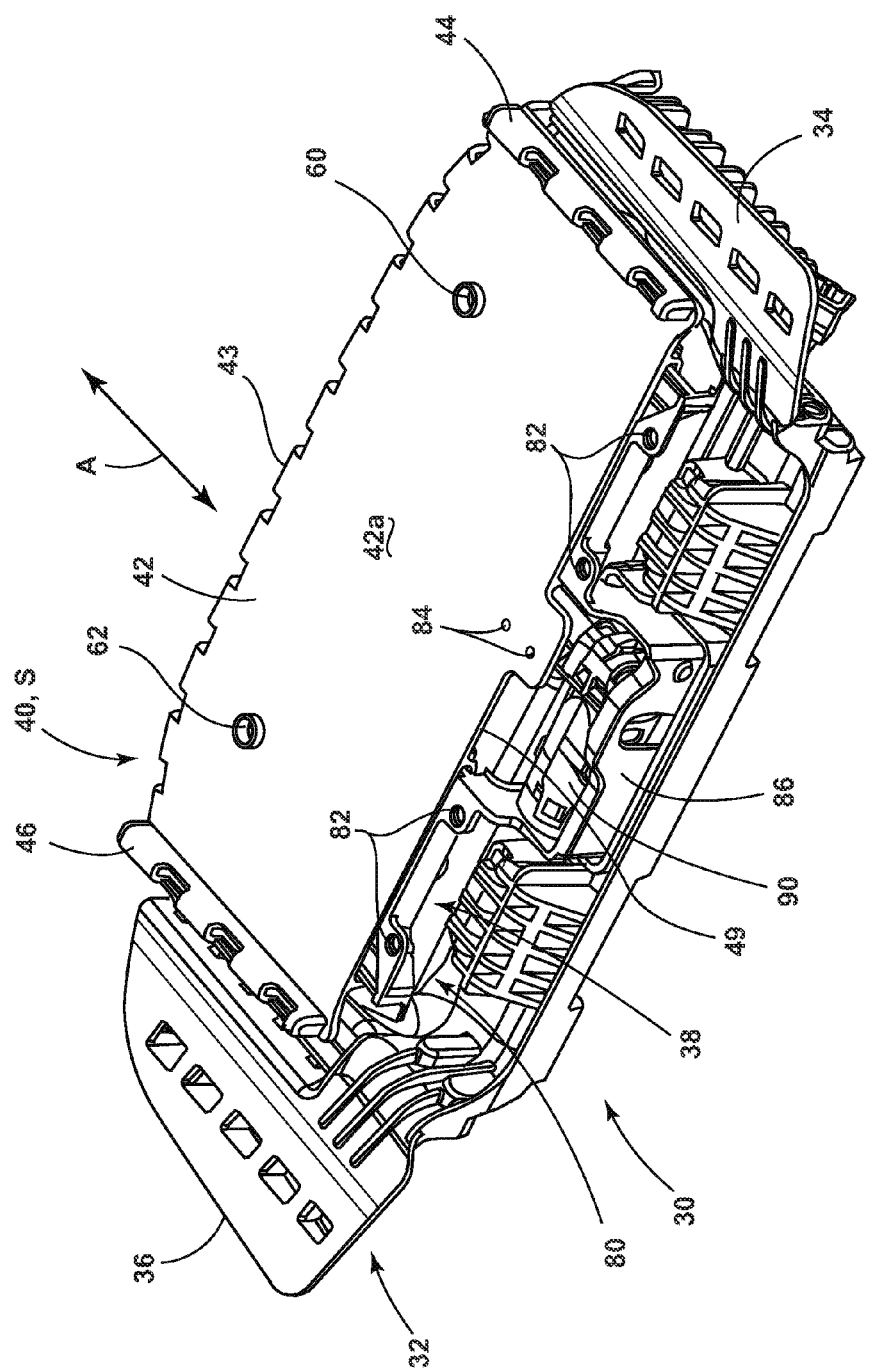
FIG. 5 is a top perspective view of the thigh support assembly of FIG. 4 with a carriage assembly in a stowed position on a carrier assembly.

Referring now to FIG. 5, the gap hider assembly 70 has been removed from the adjustable thigh support 30 to reveal the full upper surface 42a of the body portion 42 of the carriage assembly 40. As shown in FIG. 5, the support platform 80 includes mounting apertures 82 which are configured to couple the second portion 74 of the gap hider assembly 70 via fasteners 76 to the support platform 80 as shown in FIG. 4. As further shown in FIG. 5, mounting apertures 84 are disposed through the body portion 42 of the carriage assembly 40 at a rear edge 49 thereof. As further shown in FIG. 5, a motor 90 is disposed in a motor housing 86 which is an integral part of the support platform 80. The support platform 80 is disposed in the carriage receiving area 38 and is contemplated to be fixedly coupled to the carrier assembly 32 and slideably coupled to the carriage assembly 40 via one or more slide assemblies, as further described below.

Figure 6:
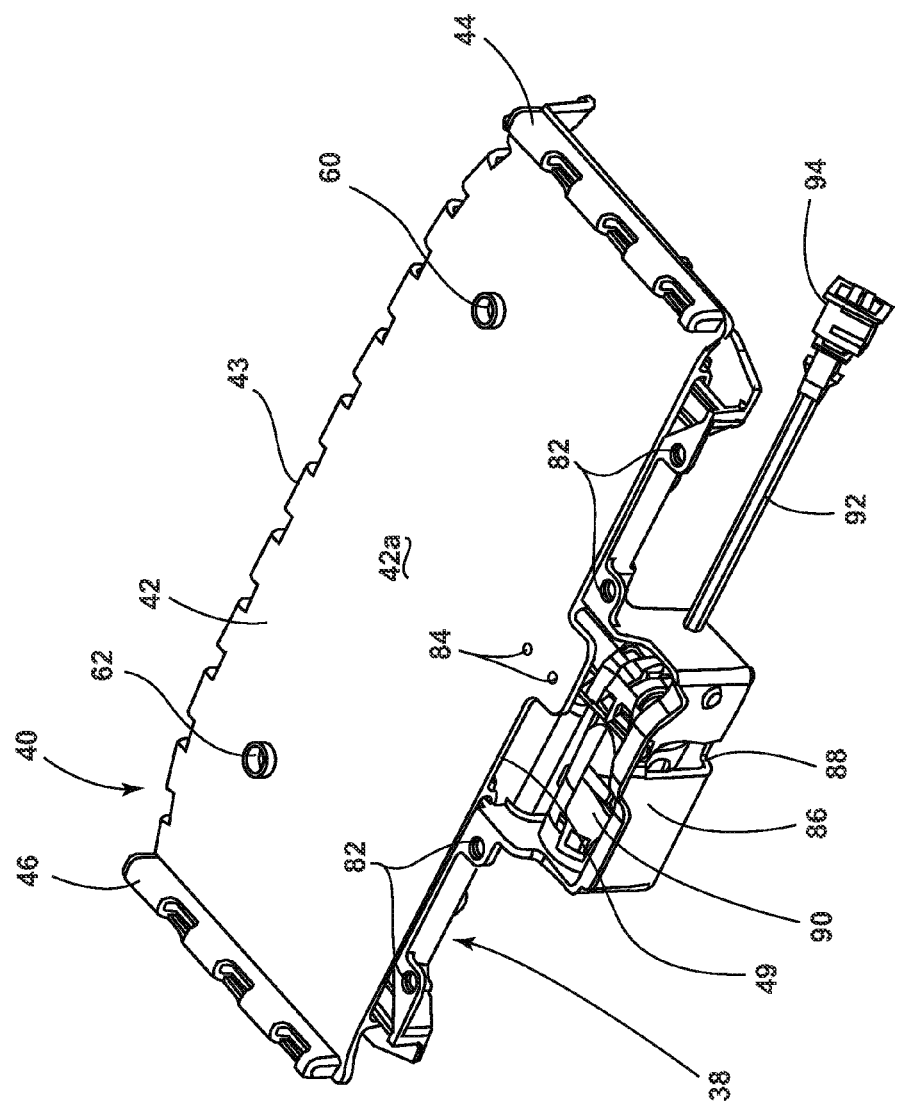
FIG. 6 is a top perspective view of the thigh support assembly of FIG. 5 with the carrier assembly removed.

Referring now to FIG. 6, the motor 90 is shown disposed in the motor housing 86 having a power cord 92 extending outwardly therefrom which includes a power plug 94 for connecting the motor 90 with a vehicle's electrical power system. While in the embodiment shown in FIG. 6, the power cord 92 is extending outwardly from a sidewall of the motor housing 86, it is contemplated that the power cord 92 may be positioned in any direction extending outwardly from the motor housing 86, such as through relief portion 88 of the motor housing 86 shown in FIG. 6.

Figure 7A:
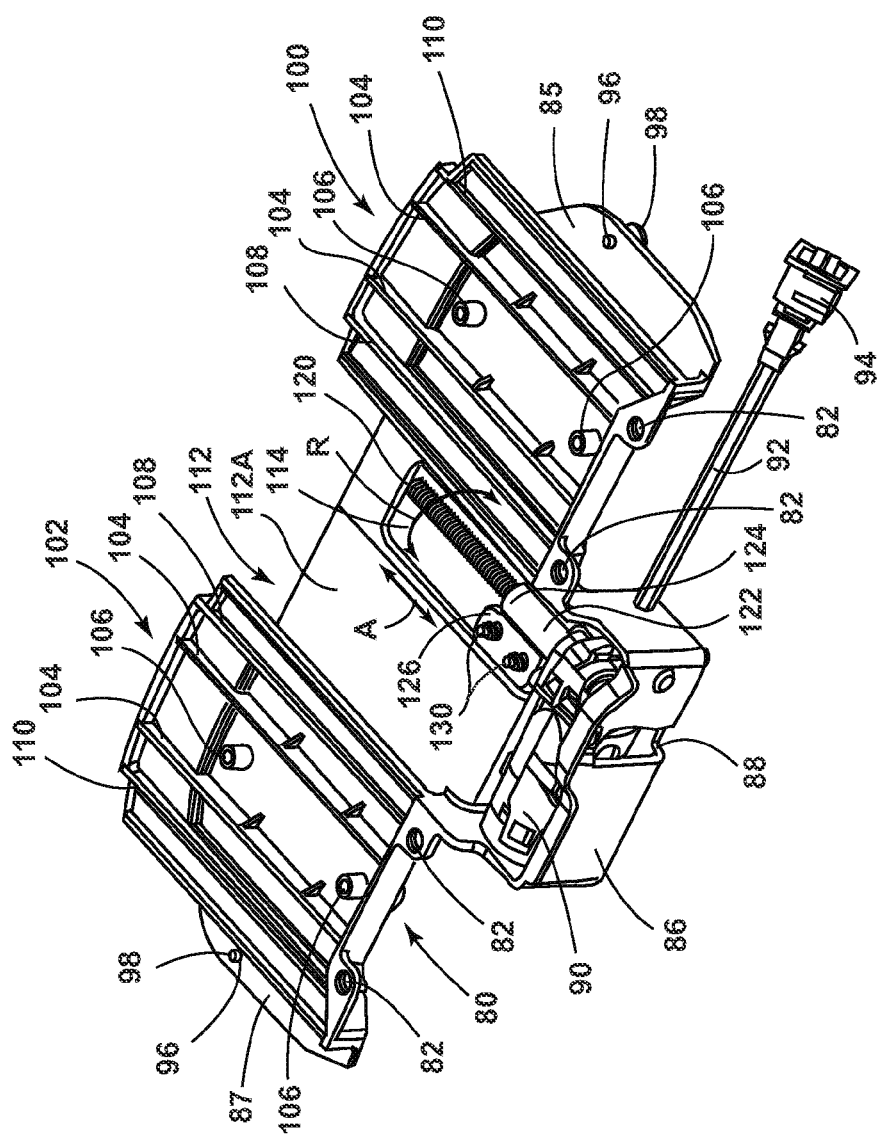
FIG. 7A is a top perspective view of a support platform housing a motor.
Figure 11A:
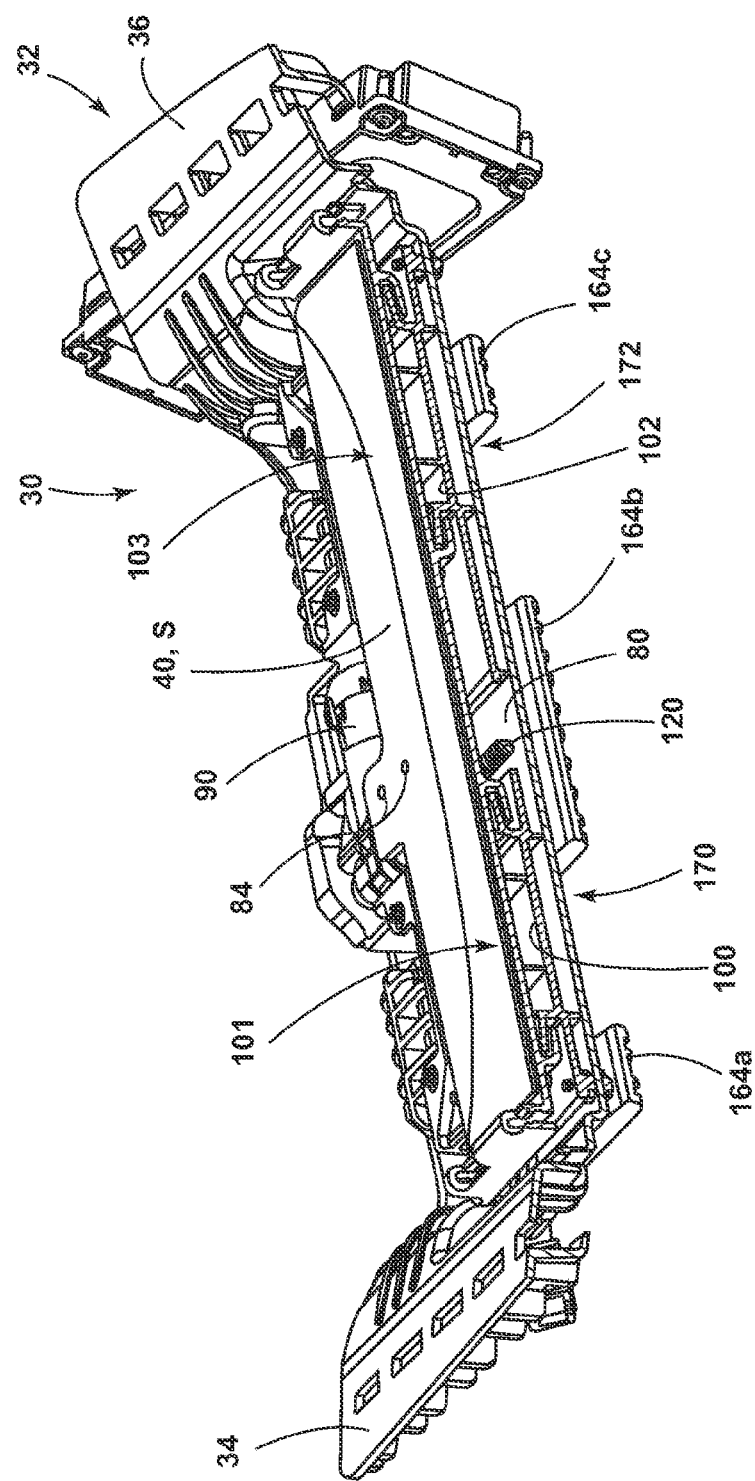
FIG. 11A is a cross-sectional view of the thigh support assembly of FIG. 4, taken at line XI.
Figure 11B:
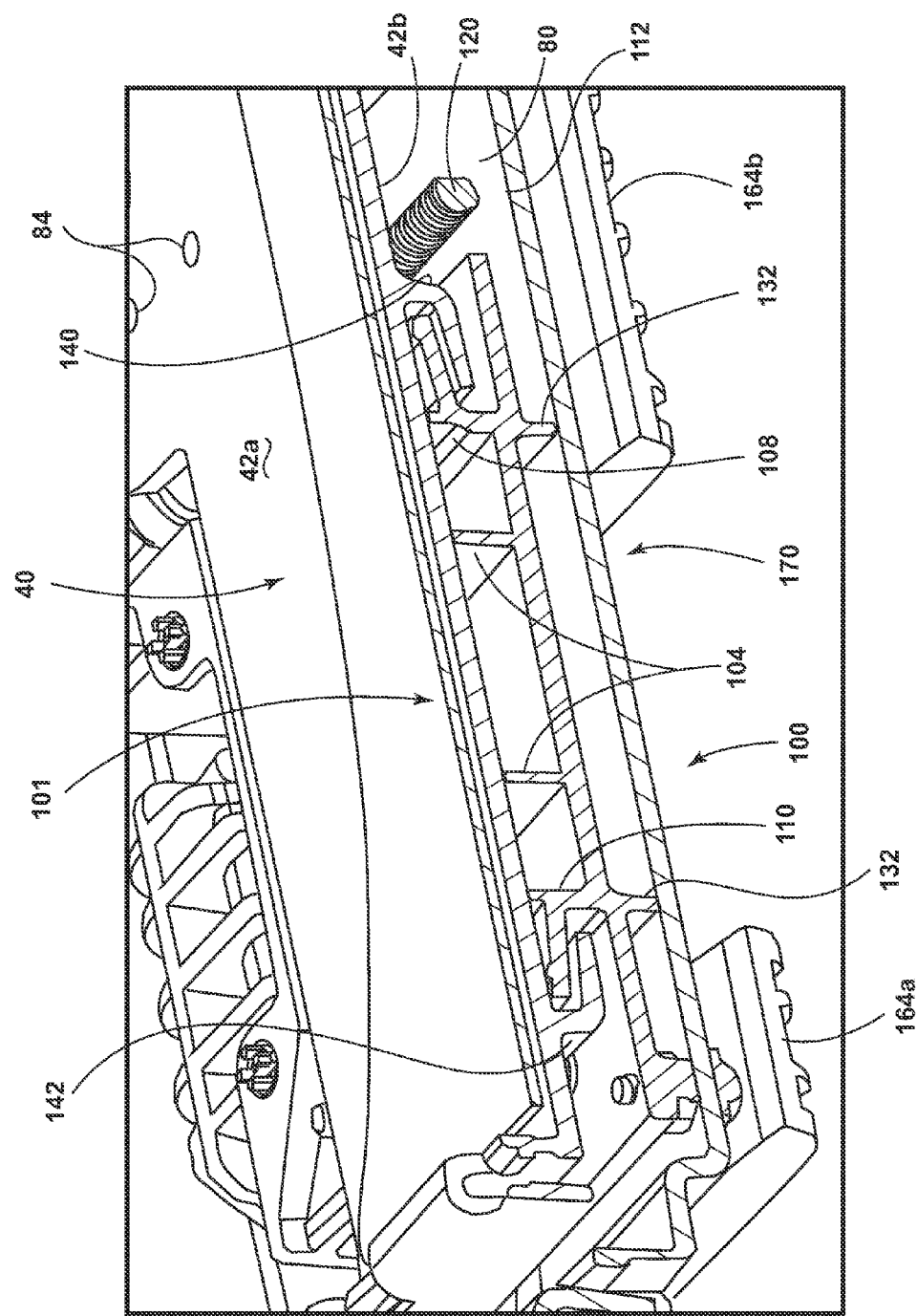
FIG. 11B is a close up cross-sectional view of the thigh support assembly of FIG. 11A.

Referring now to FIG. 7A, the support platform 80 is shown having first and second landings 85, 87 disposed at opposite ends thereof. The landings 85, 87 include mounting apertures 96 which are configured to receive fasteners 98 which are used to fixedly couple the support platform 80 to the carrier assembly 32 in the carriage receiving area 38, as shown in FIG. 5. The support platform 80 includes first and second slide members 100, 102 which include similar features described with like reference numerals throughout this disclosure. Each of the first and second slide members 100, 102 is configured to slidingly couple to the carriage assembly 40 to define a slide assembly therebetween. The first and second slide members 100, 102 may be described herein as lower slide members configured to slidingly engage upper slide members 101, 103 (FIG. 9B) disposed on an underside of the carriage assembly 40, as further described below. Each of the first and second slide members 100, 102 include upwardly extending support rails 104 that generally run the length of the first and second slide members 100, 102. Support bosses 106 are also disposed in-between pairs of the support rails 104 in each of the first and second slide members 100, 102. Disposed outwardly of the support rails 104, inner and outer L-shaped flanges 108, 110 are disposed having outwardly extending mounting portions used to couple the first and second slide members 100, 102 to the upper slide members 101, 103 (FIG. 9B) of the carriage assembly 40 in a manner as best shown in FIGS. 11A and 11B. The first and second slide members 100, 102 are spaced-apart on an upper surface 112A of a body portion 112 of the support platform 80. The body portion 112 includes a receiving aperture 114 disposed therethrough, which, as shown in FIG. 7A, is configured to receive a driveshaft 120 which is operably coupled to the motor 90 for rotation therewith along the rotational path as indicated by arrow R.

As further shown in FIG. 7A, the driveshaft 120 is a threaded driveshaft 120 that is gearingly coupled to a mounting bracket 122 at a ferrule portion 124 of the mounting bracket 122. The ferrule portion 124 is contemplated to be an internally threaded member that corresponds to and matingly engages with the threads of the driveshaft 120 to translate the mounting bracket 122 in a horizontal manner within the receiving aperture 114, as indicated by arrow A. The mounting bracket 122 further includes a mounting portion 126 which extends outwardly from the ferrule portion 124. The mounting portion 126 includes apertures 128 (FIG. 8) and fasteners 130 which are configured to align with mounting apertures 84 disposed through the body portion 42 of the carriage assembly 40. The fasteners 130 are configured to couple the carriage assembly 40 to the mounting bracket 122 for horizontal movement therewith between extended and retracted positions (as well as infinite positions therebetween) of the carriage assembly 40 relative to the carrier assembly 32 and support platform 80, as powered by the motor 90. While the thigh support assembly 30 of the present concept is contemplated to be powered by the motor 90, it is further conceivable that the thigh support assembly 30 can be configured for manual adjustment of the carriage assembly 40 relative to the carrier assembly 32 and support platform 80 for supporting the carriage assembly 40 at various degrees of extension.

Figure 7B:
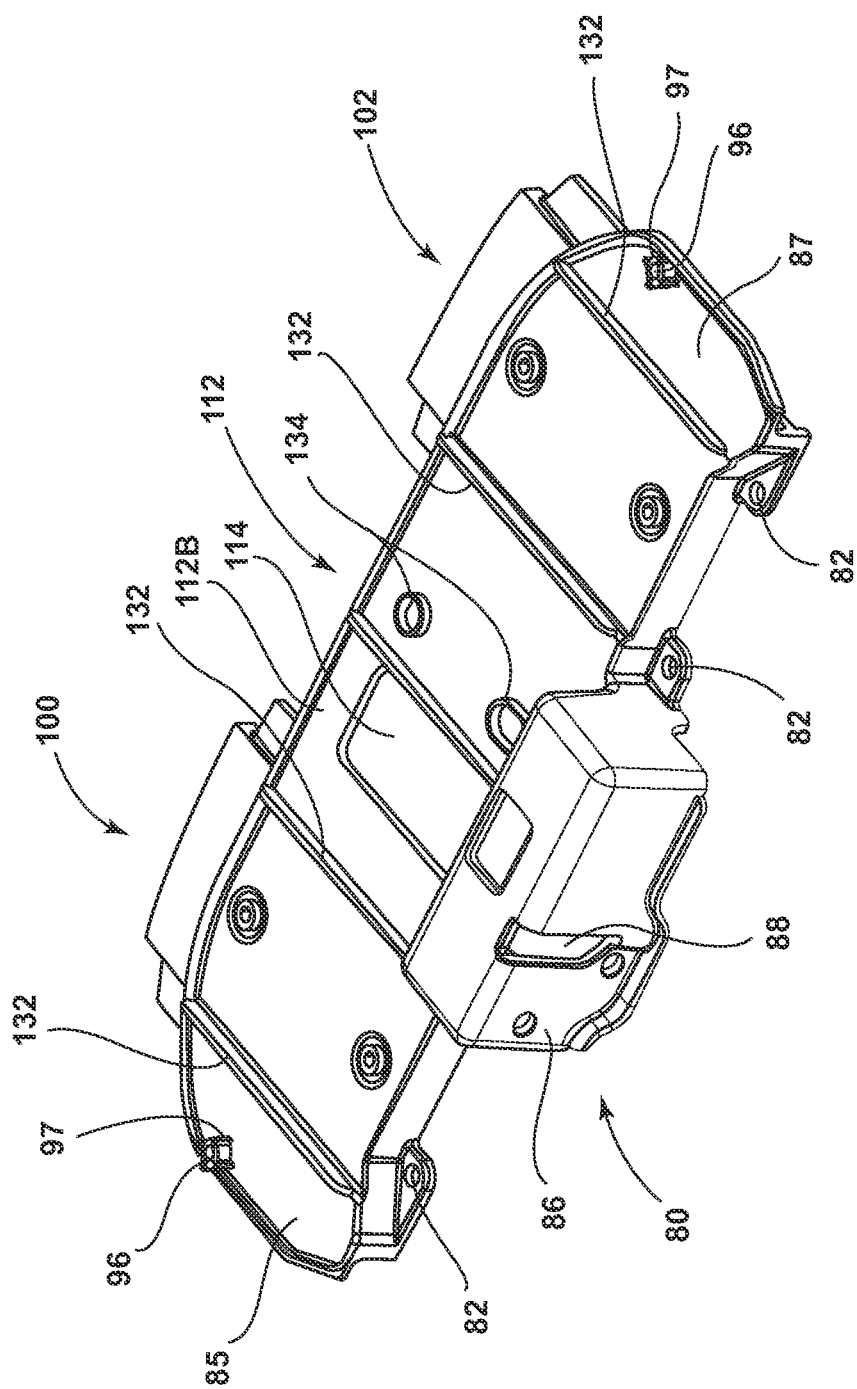
FIG. 7B is a bottom perspective view of the support platform of FIG. 7A with the motor removed.

Referring now to FIG. 7B, the support platform 80 is shown from a bottom perspective view with the motor 90 removed from the motor housing 86. An underside 112B of the body portion 112 includes a plurality of raised standoff features 132 in the form of rails extending across a length of the underside 112B. Other standoff features 134 are also disposed on the underside 112B of the body portion 112, and along with the standoff features 132, are configured to abut the carrier assembly 32 at the carriage receiving area 38 in assembly. As further shown in FIG. 7B, the mounting apertures 96 disposed on the landings 85, 87 include raised portions 97 for further abutting the carriage receiving area 38 of the carrier assembly 32.

Figure 8:
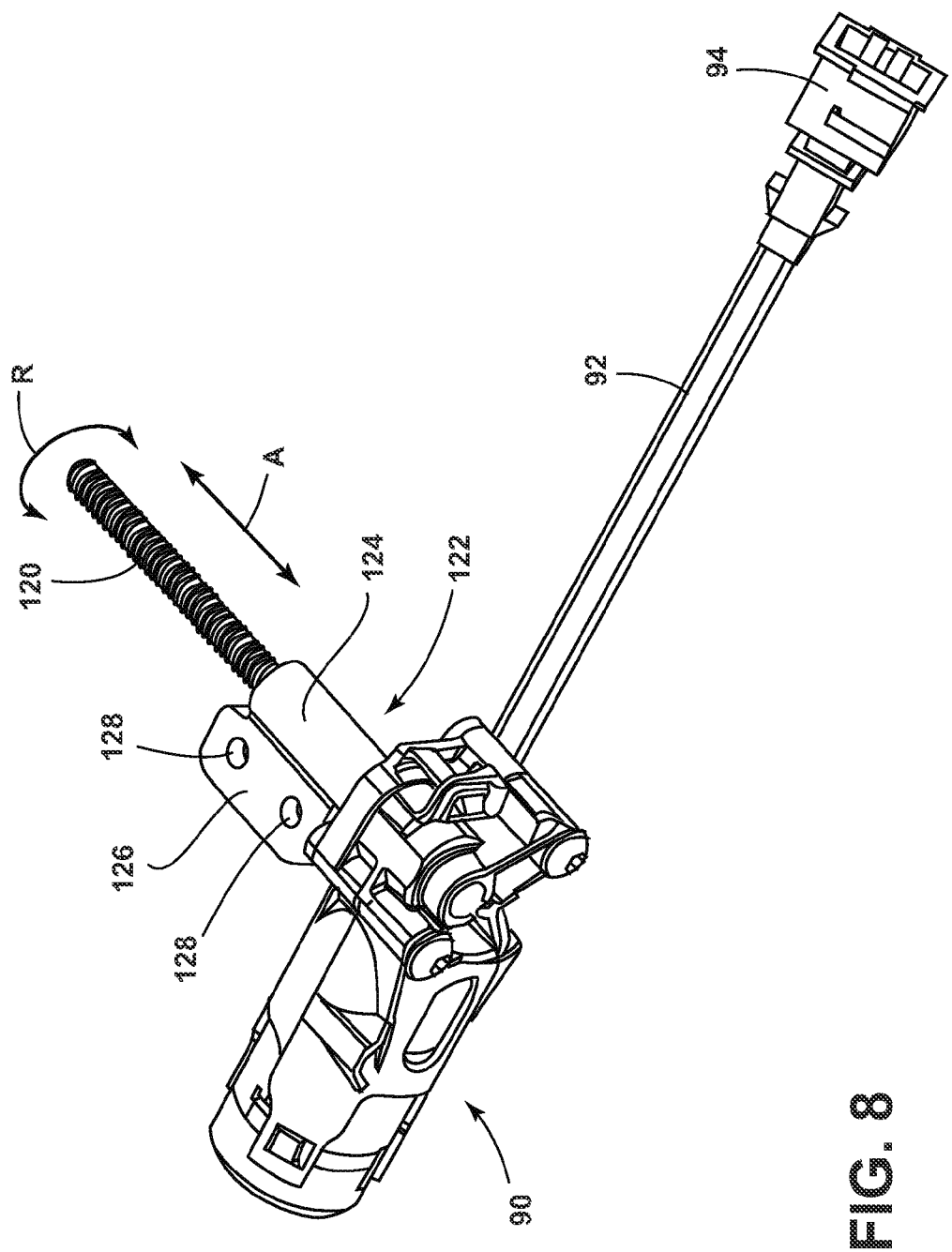
FIG. 8 is a top perspective view of a motor and driveshaft with a mounting bracket coupled thereto.

Referring now to FIG. 8, the motor 90 is shown with the mounting bracket 122 operably coupled to the driveshaft 120 at ferrule portion 124. It is contemplated that the mounting bracket 122 is disposed in a position on the driveshaft 120 that is directly adjacent to the motor 90, such that the position of the mounting bracket 122 shown in FIG. 8 correlates to the carriage assembly 40 being in the stowed position S, as shown in FIG. 5. Mounting apertures 128 are shown disposed through the mounting portion 126 of mounting bracket 122. In assembly, the mounting apertures 128 are configured to receive fasteners 130 (FIG. 7A) which are further configured to be received in mounting apertures 84 disposed in the body portion 42 of the carriage assembly 40, as shown in FIG. 5. Once the carriage assembly 40 is coupled to the mounting bracket 122, the motor 90 is configured to rotate the driveshaft 120 in the direction as indicated by arrow R between stowed and extended positions S, E of the carriage assembly 40, such that the adjustable thigh support assembly 30 is a powered assembly driven by the motor 90.

Figure 9:
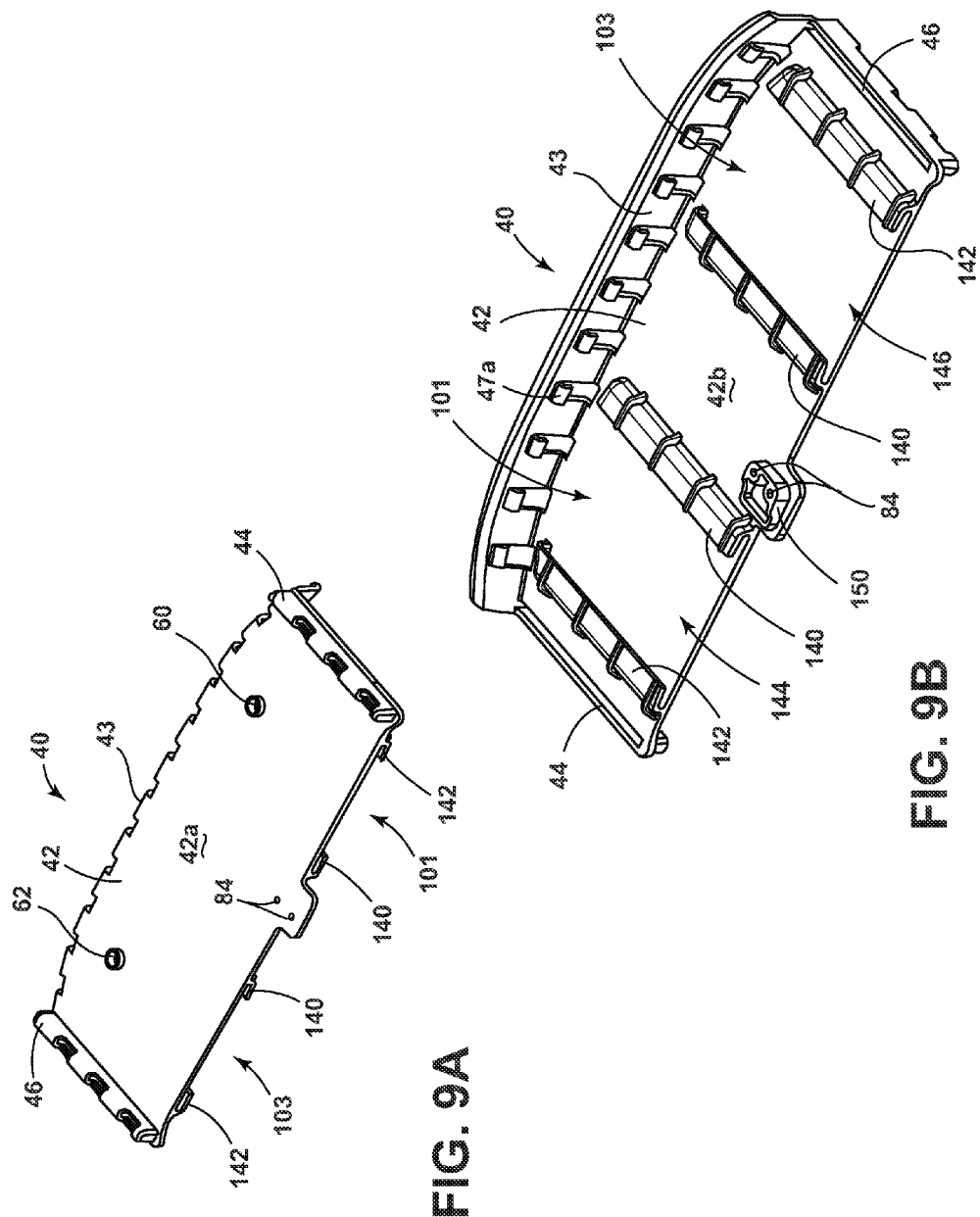
FIG. 9A is a top perspective view of the carriage assembly.
FIG. 9B is a bottom perspective view of the carriage assembly of FIG. 9A.

Referring now to FIGS. 9A and 9B, the carriage assembly 40 is shown having first and second slide members 101, 103 disposed on an underside 42b of the carriage assembly 40. The first and second slide members 101, 103 are contemplated to be upper slide members disposed on the underside 42b of the carriage assembly 40 and are configured to slidingly receive the lower first and second slide members 100, 102 disposed on the upper surface 112A of the support platform 80 as shown in FIG. 7A. The first and second slide members 101, 103 are generally defined by inner and outer L-shaped brackets 140, 142 extending downwardly from the underside 42b of the carriage assembly 40, which are spaced-apart from one another to define first and second guide channels 144, 146 therebetween, as best shown in FIG. 9B. The inner and outer L-shaped brackets 140, 142 include inwardly extending mounting portions configured to receive the outwardly extending mounting portions of the inner and outer L-shaped flanges 108, 110 of the support platform as best shown in FIG. 11B. As further shown in FIG. 9B, the mounting apertures 84 through the body portion 42 of the carriage assembly 40 are bolstered by a mounting support feature 150 disposed on the lower surface 42b of the carriage assembly 40.

Figure 10:
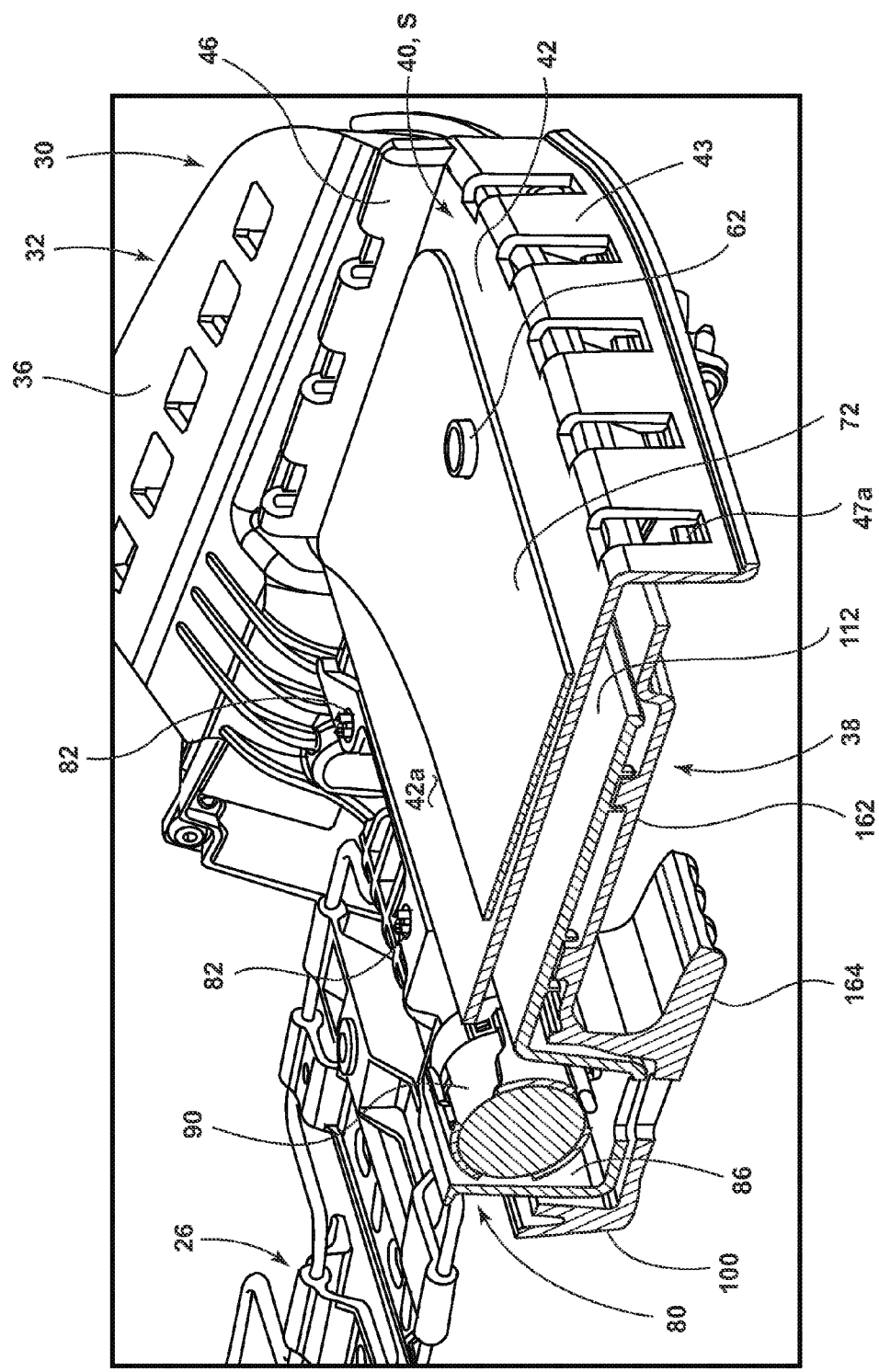
FIG. 10 is a cross-sectional view of the thigh support assembly of FIG. 4, taken at line X.

Referring now to FIG. 10, the carrier assembly 32 is shown having a cradle portion 160 configured to receive and support the motor housing 86 of the support platform 80. A bottom wall 162 of the carrier assembly 32 is configured to align with the body portion 112 of the support platform 80 and couple thereto as shown in FIG. 10. A plurality of frame engagement features 164 are further disposed on an underside of the bottom wall 162 of the carrier assembly 32 and are configured to operably couple the carrier assembly 32 to the seat frame 12 as best shown in FIG. 12.

Referring now to FIG. 11A, the carriage assembly 40 is shown coupled to the support platform 80 via first and second slide assemblies 170, 172. The first and second slide assemblies 170, 172 define a slide assembly disposed between the carriage assembly 40 and the support platform 80 which is configured to guide the lateral movement of the carriage assembly 40 as driven by the motor 90. The first and second slide assemblies 170, 172 are defined by the engagement of the first and second lower slide members 100, 102 disposed on the upper surface 112A of the support platform 80 (FIG. 7A), and the first and second upper slide members 101, 103 disposed on the underside 42b of the carriage assembly 40 as best shown in FIG. 9B. The connection of the lower and upper slide members 100, 102 and 101, 103 is best shown in FIG. 11B, as described below. As further shown in FIG. 11A, frame engagement features 164 are represented as frame engagement features 164a, 164b and 164c in FIG. 11A, having hook-like configurations for receiving a structural member of the seat frame 12, as shown in FIG. 12.

Referring now to FIG. 11B, the inner and outer L-shaped flanges 108, 110 of slide member 100 define the lower slide member configured to be received in the guide channel 144 (FIG. 9B) defined by the inner and outer L-shaped brackets 140, 142 of upper slide member 101 disposed on the carriage assembly 40. In this way, the lower and upper slide members 100, 101 define a slide assembly 170 disposed between the support platform 80 and the carriage assembly 40. It is contemplated that any number of slide assemblies can be disposed between the carriage assembly 40 and the support platform 80 as necessary to properly support the carriage assembly 40 as translated between extended and stowed positions.

Referring now to FIG. 12, the frame engagement features 164a, 164b, and 164c are shown coupled to the seat frame 12 at a cross member 12a which is contemplated to be a metal part of the seat frame 12, thereby providing a robust coupling between the carrier assembly 32 and the seat frame 12.

Figure 13A:
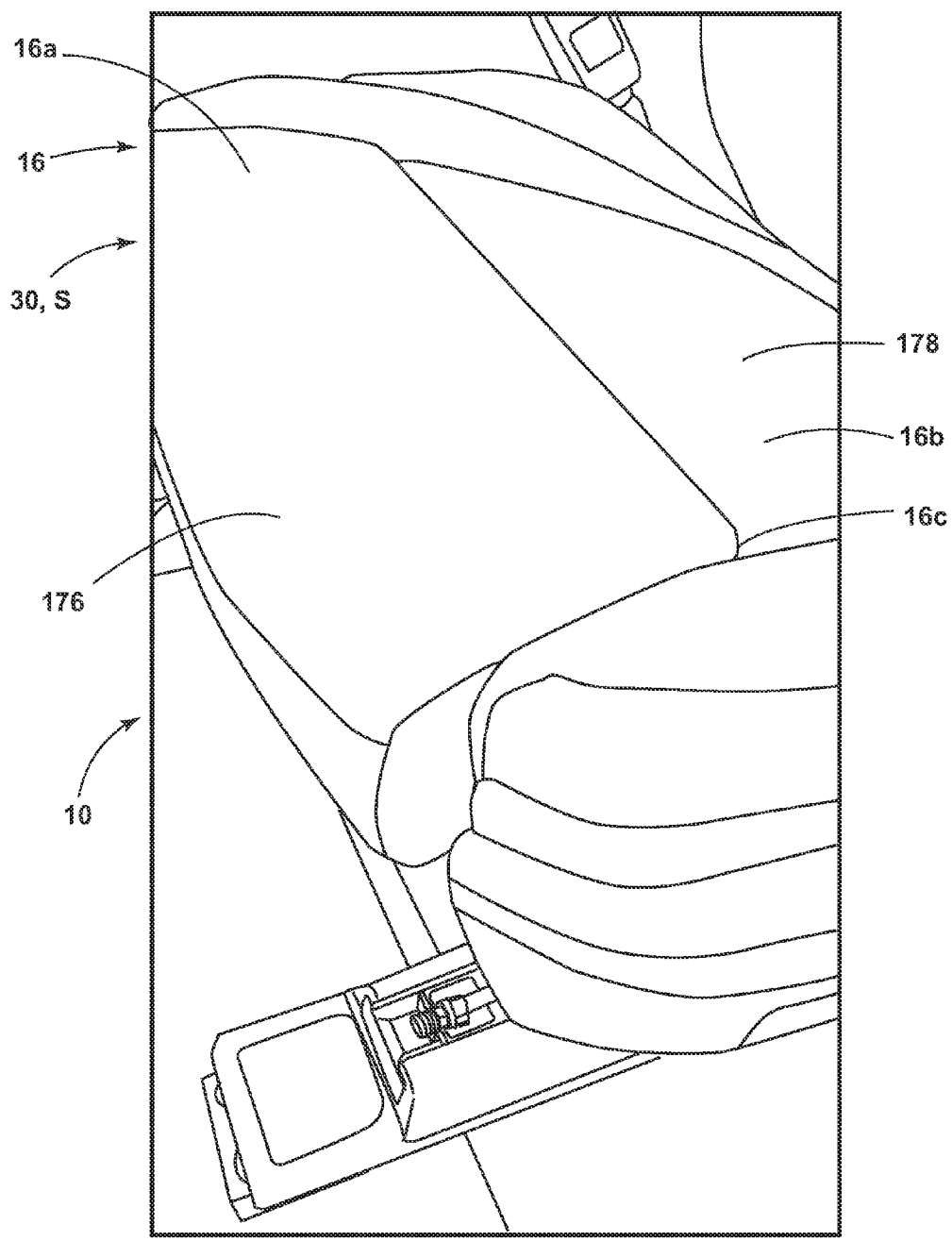
FIG. 13A is a top perspective view of a vehicle seat with a thigh support assembly in a stowed position and covered by a seat cover.
Figure 13B:
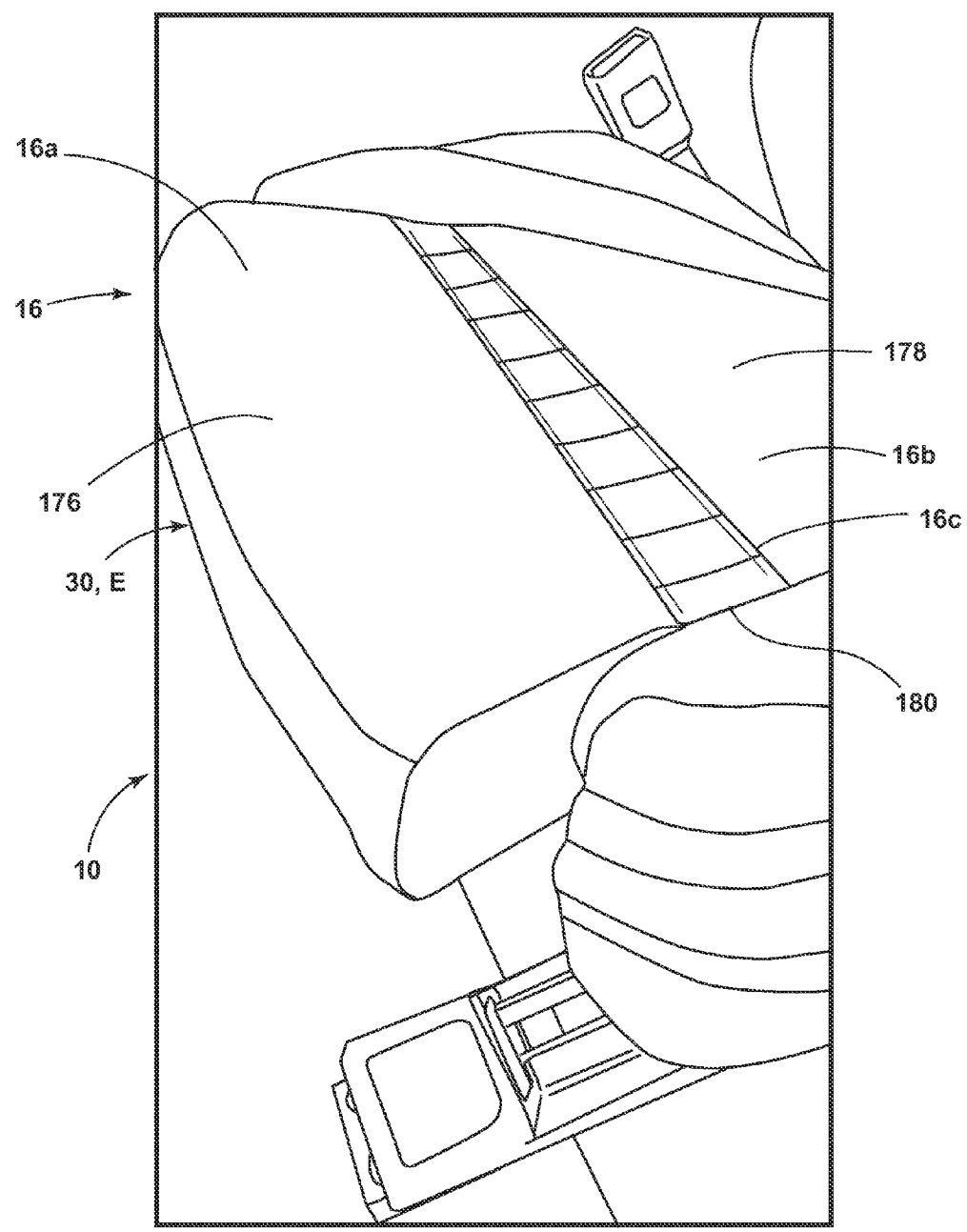
FIG. 13B is a top perspective view of the vehicle seat of FIG. 13A with the thigh support assembly in an extended position.

Referring now to FIGS. 13A and 13B, the seat portion 16 of the vehicle seat 10 is shown with the thigh support assembly 30 in the stowed position S (FIG. 13A) and in the extended position E (FIG. 13B). The thigh support assembly 30 is shown having a first cover 176 which may be a cloth cover, a leather cover, vinyl cover, or any other suitable material that covers the front portion 16a of the seat portion 16. A second cover 178 is shown in FIGS. 13A and 13B covering the rear portion 16b of the seat portion 16. The first and second covers 176, 178 meet at a parting line 16c positioned between the front portion 16a and the rear portion 16b. With specific reference to FIG. 13B, the thigh support assembly 30 is shown in the extended position E, such that an extension portion 180 of the first cover 176 disposed on the front portion 16a of the seat portion 16 is used to cover the gap G (FIG. 1B) defined between the front portion 16a and the rear portion 16b when the thigh support assembly 30 is in the extended position E. The extension portion 180 of the first cover 176 is contemplated to be made of the same material as the first cover 176. In this way, the thigh support assembly 30 of the present concept is configured to provide a unitary cover for the seat portion 16 as coupled thereto. It is contemplated that the extension portion 180 of the first cover 176 is configured to pay out as the thigh support assembly 30 moves from the stowed position S to the extended position E. The terms "pay out" or "paid out" as used herein refer to the extension portion 180 being incrementally revealed to cover the gap G between the front and rear portions 16a, 16b of the seat portion 16 as the carriage assembly 40 moves from the stowed position S to the extended position E. It is further contemplated that the extension portion 180 of the first cover 176 is biased towards a concealed or stowed configuration between the front portion 16a and the rear portion 16b of the seat portion 16, such that as the thigh support assembly 30 moves from the extended position E to the stowed position S, the extension portion 180 of the first cover 176 will be substantially concealed between the front and rear portions 16a, 16b of the seat portion 16, as best shown in FIG. 13C.

Referring now to FIGS. 13C and 13D, the thigh support assembly 30 is shown in the stowed position S and the extended position E, respectively. The seat portion 16 shown in FIGS. 13C and 13D includes a front seat cushion 200 and a rear seat cushion 202. The front seat cushion 200 is disposed over the thigh support assembly 30 for movement therewith. The first cover 176 is disposed over the front seat cushion 200 and includes an edge portion 176a which is coupled to hook 47a of the carriage assembly 40. The second seat cover 178 is disposed over the rear seat cushion 202 and the extension portion 180 is disposed between the first and second seat covers 176, 178. In FIG. 13C, the extension portion 180 of the first seat cover 176 is shown in a concealed position C disposed between the front and rear portions 16a, 16b of the seat portion 16. The extension portion 180 is biased to the concealed position C by a biasing member 204 which is contemplated to be mounted to an internal seat component, such as the support platform 80 at mounting feature 206. In FIG. 13C, the biasing member 204 is in the retracted position R, such that the slack of the extension portion 180 of the first cover 176 is pulled downward to the concealed position C by the biasing member 204. The biasing member 204 is contemplated to be a flexibly resilient member that is coupled to a stationary component of the vehicle seat 16 relative to the carriage assembly 40. With specific reference to FIG. 13D, the thigh support assembly 30 is shown in the extended position E, such that the extension portion 180 is paid out as the carriage assembly 40 moves to the extended position E along the path as indicated by arrow A. Further, the biasing member 204 is shown in a stretched or extended position E as the extension portion 180 of the first seat cover 176 is paid out based on the movement of the thigh support assembly 30. The biasing member 204 is contemplated to be an elastic band that is coupled to the extension portion 180 substantially along the length of the extension portion 180 to uniformly bias the extension portion 180 to the concealed position C, as shown in FIG. 13C, when the thigh support assembly 30 is in the stowed position S. As noted above, when the thigh support assembly 30 moves to the extended position E (FIG. 13D), the biasing member 204 will stretch to allow the extension portion 180 to substantially cover the gap G between the front and rear portions 16a and 16b of the seat portion 16, such that the seat portion 16 will have a substantially continuous appearance between first and second seat covers 176, 178.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat, comprising:
   a seat portion having front and rear portions;
   a carrier assembly disposed in the front portion and including a first side member spaced-apart from a second side member to define a carriage receiving area therebetween;
   first and second slide members disposed in the carriage receiving area, wherein the first and second slide members are disposed on an upper surface of a support platform, the support platform coupled to the carrier assembly in the carriage receiving area; and
   a carriage assembly slideably received in the carriage receiving area, the carriage assembly including first and second guide channels disposed on an underside of a body portion, wherein the first and second slide members are slideably received in the first and second guide channels of the carriage assembly to slideably couple the carriage assembly to the carrier assembly for movement of the carriage assembly between stowed and extended positions relative to the rear portion of the seat portion.

2. The vehicle seat according to claim 1, including:
   a receiving aperture disposed through the support platform between the first and second slide members.

3. The vehicle seat according to claim 2, including:
   a motor coupled to the support platform, the motor having an outwardly extending drive shaft configured for rotation as powered by the motor; and
   a mounting bracket operably coupled to the drive shaft and further coupled to the body portion of the carriage assembly through the receiving aperture of the support platform, wherein the motor is configured to drive the carriage assembly between stowed and extended positions as coupled thereto via the mounting bracket.

4. The vehicle seat according to claim 1, wherein a gap is formed between the front portion of the seat portion and the rear portion of the seat portion when the carriage assembly is in the extended position.

5. The vehicle seat according to claim 4, including:
a gap hider assembly having a first portion coupled to the carriage assembly for movement therewith, and a second portion coupled to the support platform, wherein the first portion is configured to slide along an upper surface of the second portion as the carriage assembly moves between the stowed and extended positions.

6. The vehicle seat according to claim 5, including:
a seat cover disposed on the front portion of the seat portion, wherein the seat cover is operably coupled to the carriage assembly and includes an extension portion configured to cover the gap between the front portion of the seat portion and the rear portion of the seat portion when the carriage assembly is moved to the extended position.

7. The vehicle seat according to claim 6, including:
a biasing member coupled to the extension portion of the seat cover, wherein the biasing member biases the extension portion of the seat cover towards a concealed position between the front and rear portions of the seat portion when the carriage assembly is in the stowed position, and further wherein the biasing member is flexibly resilient to pay out the extension portion of the seat cover as the carriage assembly moves from the stowed position to the extended position.

8. A vehicle seat, comprising:
a carrier assembly disposed in a seat portion and having a carriage receiving area disposed between first and second side members;
a carriage assembly slideably coupled to the carrier assembly for movement between extended and stowed positions; and
a slide assembly having upper and lower slide members disposed on the carriage assembly and the carrier assembly, respectively, for guiding the movement of the carriage assembly relative to the carrier assembly, wherein the upper slide member includes inner and outer L-shaped brackets having inwardly extending mounting portions to define a guide channel therebetween, and further wherein the inner and outer L-shaped brackets are disposed on an underside of the carriage assembly.

9. The vehicle seat according to claim 8, wherein the lower slide member is disposed on a support platform coupled to the carrier assembly.

10. The vehicle seat according to claim 9, wherein the lower slide member includes inner and outer L-shaped flanges having outwardly extending mounting portions slideably received in the guide channel of the carriage assembly, and further wherein the inner and outer L-shaped flanges are disposed on an upper side of the support platform.

11. The vehicle seat according to claim 10, wherein the slide assembly includes first and second slide assemblies.

12. The vehicle seat according to claim 11, including:
a motor disposed on the support platform and operably coupled to the carriage assembly for powering the carriage assembly between the extended and stowed positions; and
a mounting bracket operably coupled to a drive shaft extending outwardly from the motor at a ferrule portion of the mounting bracket, wherein the mounting bracket is further coupled to a body portion of the carriage assembly through a receiving aperture disposed through a body portion of the support platform.

13. A vehicle seat, comprising:
a seat portion including a seat frame;
a carrier assembly disposed in the seat portion and operably coupled to the seat frame, the carrier assembly including a first side member spaced-apart from a second side member to define a carriage receiving area therebetween;
a support platform disposed in the carriage receiving area and having at least one slide member disposed on an upper surface thereof;
a carriage assembly received in the carriage receiving area, the carriage assembly including a substantially planar body portion having at least one guide channel disposed on an underside of the body portion of the carriage assembly for slideably receiving the at least one slide member, wherein the at least one guide channel is defined by inner and outer brackets which are spaced-apart from one another on the underside of the body portion of the carriage assembly having inwardly extending mounting portions;
a motor operably coupled to the carrier assembly and having an outwardly extending drive shaft configured for rotation as powered by the motor; and
a mounting bracket operably coupled to the drive shaft and further coupled to the body portion of the carriage assembly, wherein the motor is configured to drive the carriage assembly between stowed and extended positions.

14. The vehicle seat according to claim 13, wherein the at least one slide member is defined by inner and outer flanges disposed on the upper surface of the support platform, the inner and outer flanges having outwardly extending mounting portions slideably received on the inwardly extending mounting portions of the inner and outer brackets.

15. The vehicle seat according to claim 13, wherein the at least one guide channel includes first and second guide channels.

16. The vehicle seat according to claim 15, wherein the at least one slide member includes first and second slide members received in the first and second guide channels.

17. The vehicle seat according to claim 13, wherein the carrier assembly includes one or more frame engagement features configured to couple the carrier assembly to the seat frame at a cross member thereof.

* * * * *